us006747698B2

(12) United States Patent
Abe

(10) Patent No.: US 6,747,698 B2
(45) Date of Patent: Jun. 8, 2004

(54) IMAGE INTERPOLATING DEVICE

(75) Inventor: Nobuaki Abe, Saitama (JP)

(73) Assignee: PENTAX Corporation, Tokyo (JP)

( * ) Notice: Subject to any disclaimer, the term of this patent is extended or adjusted under 35 U.S.C. 154(b) by 78 days.

(21) Appl. No.: 10/050,990

(22) Filed: Jan. 22, 2002

(65) Prior Publication Data

US 2002/0101434 A1 Aug. 1, 2002

(30) Foreign Application Priority Data

Jan. 26, 2001 (JP) .................................. P2001-018258

(51) Int. Cl.[7] .......................... H04N 3/14; H04N 5/335; H04N 9/04; H04N 9/083

(52) U.S. Cl. .................. 348/273; 345/606; 358/525; 348/237; 348/280; 348/281

(58) Field of Search ................. 345/606, 607, 345/608, 609, 610; 358/525; 348/281, 282, 272, 273, 280; 382/300

(56) References Cited

FOREIGN PATENT DOCUMENTS

JP         10108209         4/1998

*Primary Examiner*—Matthew C. Bella
*Assistant Examiner*—Antonio A Caschera
(74) *Attorney, Agent, or Firm*—Greenblum & Bernstein, P.L.C.

(57) ABSTRACT

An image interpolating device comprises a color filter, in which R, G, and B color filter elements are disposed in a checkerboard arrangement, and an imaging device which generates R, G, and B-signals corresponding to the color filter elements. In an interpolation process, the difference between a first comparative value V1 and a second comparative value V2 is compared. V1 is determined using color signals of pixels offset in the right and left directions to an objective pixel. V2 is determined using color signals of pixel offset in the upper and lower directions to the objective pixel. When V1 is less than V2, an arithmetic mean of G-signals of pixels offset in the right and left directions by one pixel is obtained as an interpolated G-signal. When V1 is not less than V2, an arithmetic mean of G-signals of pixels offset in the upper and lower directions by one pixel is obtained as the interpolated G-signal.

14 Claims, 9 Drawing Sheets

| R (0, 0) g | G (1, 0) r, b | R (2, 0) g | G (3, 0) r, b | R (4, 0) g | |
|---|---|---|---|---|---|
| G (0, 1) r, b | B (1, 1) g | G (2, 1) r, b | B (3, 1) g | G (4, 1) r, b | |
| R (0, 2) g | G (1, 2) r, b | R (2, 2) g | G (3, 2) r, b | R (4, 2) g | |
| G (0, 3) r, b | B (1, 3) g | G (2, 3) r, b | B (3, 3) g | G (4, 3) r, b | |
| R (0, 4) g | G (1, 4) r, b | R (2, 4) g | G (3, 4) r, b | R (4, 4) g | |
| | | | | | |

Fig. 3

| R(0,0) | G(1,0) | R(2,0) | G(3,0) | R(4,0) | |
|---|---|---|---|---|---|
| G(0,1) | B(1,1) | G(2,1) | B(3,1) | G(4,1) | |
| R(0,2) | G(1,2) | R(2,2) | G(3,2) | R(4,2) | |
| G(0,3) | B(1,3) | G(2,3) | B(3,3) | G(4,3) | |
| R(0,4) | G(1,4) | R(2,4) | G(3,4) | R(4,4) | |
| | | | | | |

Fig. 7

| R(0,0)<br>g | G(1,0)<br>r,b | R(2,0)<br>g | G(3,0)<br>r,b | R(4,0)<br>g | |
|---|---|---|---|---|---|
| G(0,1)<br>r,b | B(1,1)<br>g | G(2,1)<br>r,b | B(3,1)<br>g | G(4,1)<br>r,b | |
| R(0,2)<br>g | G(1,2)<br>r,b | R(2,2)<br>g | G(3,2)<br>r,b | R(4,2)<br>g | |
| G(0,3)<br>r,b | B(1,3)<br>g | G(2,3)<br>r,b | B(3,3)<br>g | G(4,3)<br>r,b | |
| R(0,4)<br>g | G(1,4)<br>r,b | R(2,4)<br>g | G(3,4)<br>r,b | R(4,4)<br>g | |
| | | | | | |

IMAGE INTERPOLATING DEVICE

BACKGROUND OF THE INVENTION

1. Field of the Invention

The present invention relates to an image interpolating device provided in a digital camera, for example, to improve color image quality.

2. Description of the Related Art

Conventionally, there is known a digital camera in which a color filter of the Bayer arrangement is provided on a light receiving surface of an imaging device such as a CCD so as to sense a color image. The color filter is formed by arranging red(R), green(G), and blue(B) color filter elements in a checkerboard arrangement, and the color filter elements correspond to photodiodes of the imaging device. Therefore, a pixel signal of a color, which corresponds to each of the color filter elements, is generated by each of the photodiodes. For example, an R pixel signal is generated by a photodiode corresponding to an R color filter element.

A pixel signal may be subjected to an interpolating process so that a color image having a higher quality is obtained, in comparison with the case in which a pixel signal output from the imaging device is used just as it is. In a usual interpolating process, regarding an objective pixel from which an R-signal is obtained by a photodiode, a G-signal is generated by taking an average of the G-signals of pixels positioned around the objective pixel, and a B-signal is generated by taking an average of the B-signals of pixels positioned around the objective pixel. However, for example, in an image in which spatial frequency is high, the actual color of the objective pixel, for which a color is to be obtained by interpolation, may be largely different from the actual colors of the pixels around the objective pixel. In such a case, chromatic blur occurs because of the color signal of the pixel obtained by interpolation.

SUMMARY OF THE INVENTION

Therefore, an object of the present invention is to reduce the chromatic blur which occurs in a reproduced image because of the interpolating process.

According to the present invention, there is provided an image interpolating device comprising a color filter, an imaging device, a pattern-setting processor, a first G-interpolation processor, a second G-interpolation processor, an R/B-interpolation processor, a B-interpolation processor, and an R-interpolation processor.

The color filter has a first row, in which red(R) and green(G) color filter elements are alternately aligned in the horizontal direction, and a second row, in which G and blue(B) color filter elements are alternately aligned in the horizontal direction. The second row is adjacent to the upper or lower side of the first row. The imaging device generates first R, G, and B-signals which are pixel signals corresponding to the color filter elements. The pattern-setting processor extracts images belonging to a first pattern, in which a pixel having the first R-signal is positioned at the upper-left corner of a 2×2 pixel matrix, a second pattern, in which a pixel having the first G-signal is positioned at the upper-right corner of the 2×2 pixel matrix, a third pattern, in which a pixel having the first G-signal is positioned at the lower-left corner of the 2×2 pixel matrix, and a fourth pattern, in which a pixel having the first B-signal is positioned at the lower-right corner of the 2×2 pixel matrix, from the first R, G, and B-signals generated by the imaging device. The first G-interpolation processor, regarding a first objective pixel contained in the images belonging to the first pattern, obtains a first interpolated G-signal based on a first difference signal, which is a difference between the first G-signals of pixels offset from the first objective pixel in the right and left directions or the upper and lower directions by one pixel, second difference signals, each of which is a difference between the first R-signal of the first objective pixel and the first R-signal of a pixel offset from the first objective pixel in the right, left, upper, or lower direction by two pixels, third difference signals, each of which is a difference between the first R-signal of the first objective pixel and the first G-signal of a pixel offset from the first objective pixel in the right, left, upper, or lower direction by one pixel. The second G-interpolation processor, regarding a fourth objective pixel contained in the images belonging to the fourth pattern, obtains a second interpolated G-signal based on a fourth difference signal, which is a difference between the first G-signals of pixels offset from the fourth objective pixel in the right and left directions or the upper and lower directions by one pixel, fifth difference signals, each of which is a difference between the first B-signal of the fourth objective pixel and the first B-signal of a pixel offset from the fourth objective pixel in the right, left, upper, or lower direction by two pixels, sixth difference signals, each of which is a difference between the first B-signal of the fourth objective pixel and the first G-signal of a pixel offset from the fourth objective pixel in the right, left, upper, or lower direction by one pixel. The R/B-interpolation processor, regarding second and third objective pixels contained in the images belonging to the second and third patterns, obtains second R and B-signals by utilizing the first R and B-signals of pixels adjacent to the second and third objective pixels. The B-interpolation processor extracts a first similar pixel which has the closest luminance value to that of the first objective pixel, from pixels adjacent to the first objective pixel, and obtains a third B-signal based on a pixel of the first similar pixel. The R-interpolation processor extracts a second similar pixel which has the closest luminance value to that of the fourth objective pixel, from pixels adjacent to the fourth objective pixel, and obtains a third R-signal based on a pixel signal of the second similar pixel.

BRIEF DESCRIPTION OF THE DRAWINGS

The objects and advantages of the present invention will be better understood from the following description, with reference to the accompanying drawings in which:

FIG. 3 is a view showing coordinates and colors of pixels forming an image;

FIG. 7 is a view showing pixel signals obtained by executing the first and second G-interpolation process routines and the R/B-interpolation process routine;

DESCRIPTION OF THE PREFERRED EMBODIMENTS

Figure 1:
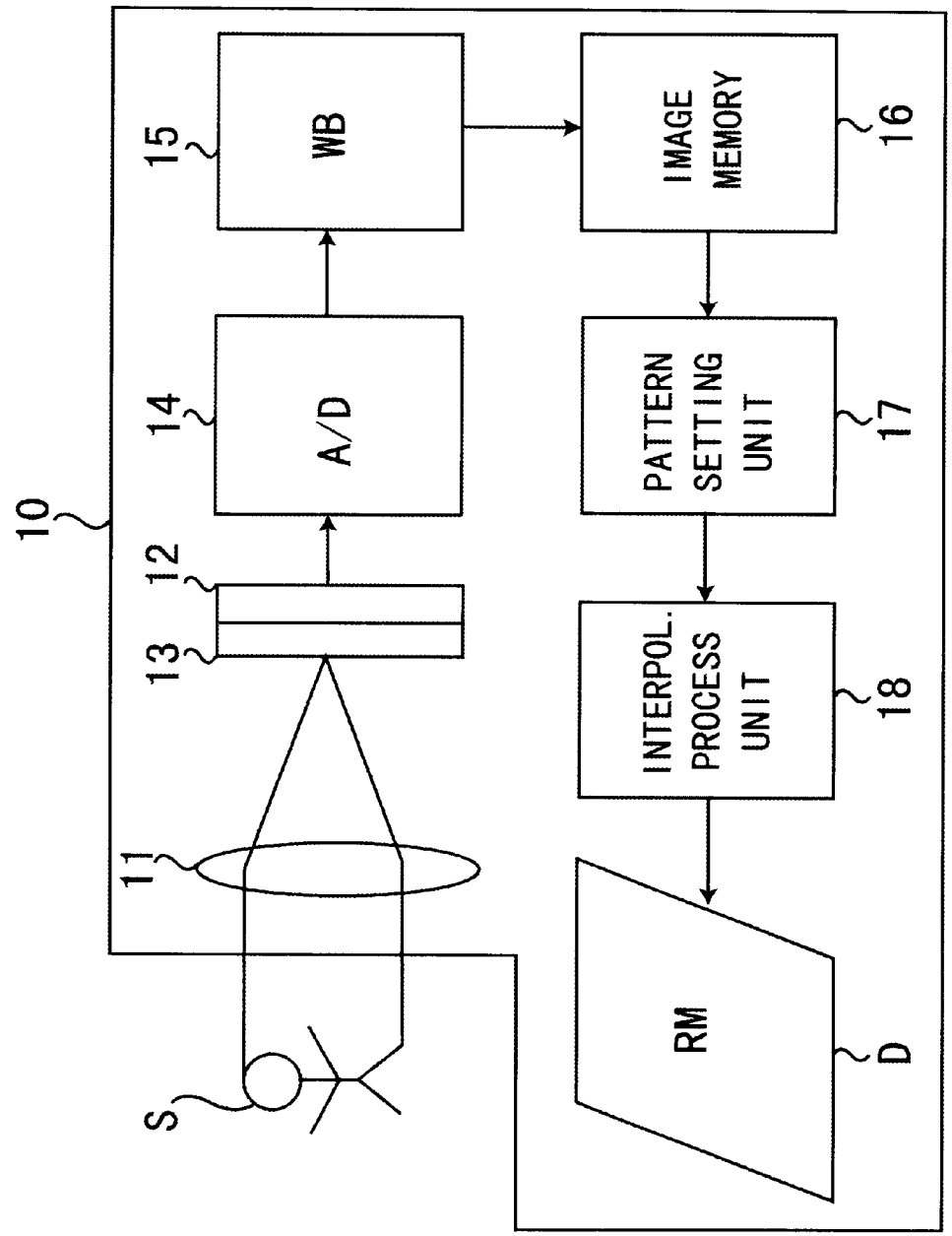
FIG. 1 is a block diagram showing a general structure of a digital camera provided with an image interpolating device to which an embodiment of the present invention is applied.

The present invention will be described below with reference to embodiments shown in the drawings.

FIG. 1 is a block diagram showing a general structure of a digital camera 10 provided with an image interpolating device to which a first embodiment of the present invention is applied.

A CCD 12, which is an imaging device, is disposed behind a photographing lens 11, and a color filter 13 is provided on a light receiving surface of the CCD 12. Namely, an optical image of a subject S, which is obtained by the photographing lens 11, is formed on the light receiving surface of the CCD 12, so that color pixel signals forming the subject image are generated on photodiodes of the CCD 12. The pixel signals are read from the CCD 12, and are converted to digital signals by an A/D converter 14. The digital pixel signals are subjected to a white balance adjustment in a white balance adjusting circuit 15, and are then stored in an image memory 16.

The pixel signals are read from the image memory 16, and input to a pattern-setting unit 17. As will be described in detail later, in the pattern-setting unit 17, pixel signals forming a predetermined arrangement pattern are extracted from all the pixel signals, and are classified into first, second, third, and fourth patterns. In an interpolation process unit 18, the pixel signals extracted in the pattern-setting unit 17 are subjected to an interpolating process corresponding to the pattern. The pixel signals, which have been subjected to the interpolating process and output from the interpolation process unit 18, are recorded in a recording medium D, such as a memory card. Note that the white balance adjusting circuit 15 does not have to be provided behind the A/D converter 14, and it can be behind the interpolation process unit 18.

Figure 2:
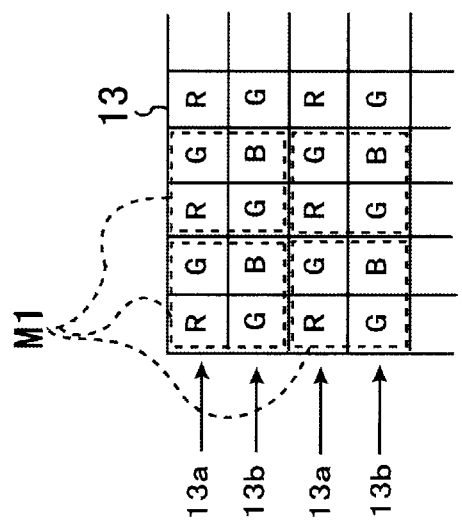
FIG. 2 is a view showing an arrangement of color filter elements of a color filter, and pixel signals of an image belonging to a pattern extracted in a pattern-setting unit.

FIG. 2 is a view showing an arrangement of color filter elements of the color filter 13, and pixel signals of an image belonging to a pattern extracted in the pattern-setting unit 17. The color filter 13 is composed of red(R), green(G), and blue(B) color filter elements, which are disposed in accordance with the Bayer arrangement. Namely, the color filter 13 is composed of a first row 13a, in which R and G color filter elements are alternately aligned in the horizontal direction, and a second row 13b, which is adjacent to the upper or lower side of the first row 13a, and in which G and B color filter elements are alternately aligned in the horizontal direction. In the CCD 12, first R, G, and B-signals, which are pixel signals corresponding to the color filter elements, are generated.

The color filter 13 is divided into a 2×2 pixel matrix M1 in which an R color filter element is positioned at the upper-left corner, a G color filter element is positioned at both the upper-right corner and the lower-left corner, and a B color filter element is positioned at the lower-right corner. The pattern-setting unit 17 extracts images belonging to a first pattern, in which a pixel having the first R-signal is positioned at the upper-left corner of the 2×2 pixel matrix, a second pattern, in which a pixel having the first G-signal is positioned at the upper-right corner of the 2×2 pixel matrix, a third pattern, in which a pixel having the first G-signal is positioned at the lower-left corner of the 2×2 pixel matrix, and a fourth pattern, in which a pixel having the first B-signal is positioned at the lower-right corner of the 2×2 pixel matrix, from the first R, G, and B-signals generated by the CCD 12.

In the pattern-setting unit 17, the first pattern is extracted from all of the pixel signals forming the whole image, according to the logical operation (1) described in C language.

$$!(x\%2)\&\&!(y\%2) \tag{1}$$

Note that, in the logical operation (1), "x" and "y" respectively indicate an abscissa and an ordinate in which the upper-left corner of the image is the origin (0,0). Namely, the coordinate of the R-signal of the left corner is (0,0), and the coordinate of the G-signal of the next pixel on the right side is (1,0). Further, in the logical operation (1), "!" indicates the logical negation, and "%" indicates the residue, and "&&" indicates the logical product. Therefore, according to the logical operation (1), an image composed of a pixel, in which both the x-ordinate and the y-ordinate are even numbers, is extracted (R-signal in FIG. 2).

Similarly, the second pattern, the third pattern, and the fourth pattern are respectively extracted according to the logical operations (2), (3), and (4).

$$(x\%2)\&\&!(y\%2) \tag{2}$$

$$!(x\%2)\&\&(y\%2) \tag{3}$$

$$(x\%2)\&\&(y\%2) \tag{4}$$

With reference to FIGS. 3 through 9, an operation in the interpolation process unit 18 will be described below. FIG. 3 shows coordinates and colors of pixels forming an image, which are stored in the image memory 16. In the interpolation process unit 18, as will be described later, the first and second G-interpolation process routines (FIG. 4 and FIG. 5), the R/B-interpolation process routine (FIG. 6), the B-interpolation process routine (FIGS. 8A, 8B), and the R-interpolation process routine (FIG. 9) are executed. In these interpolation process routines, the coordinates of the objective pixel, obtained by the interpolation process, are (x,y).

Figure 4:
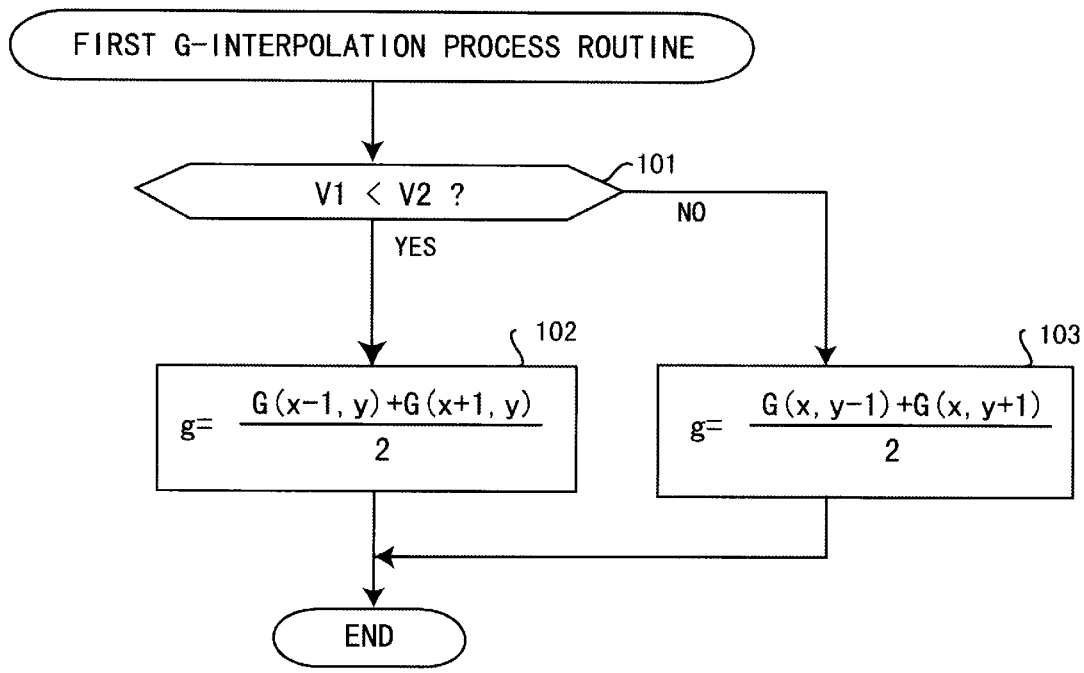
FIG. 4 is a flowchart of a first G-interpolation process routine.

FIG. 4 is a flowchart of the first G-interpolation process routine. In the first G-interpolation process routine, an interpolation process for images belonging to the first pattern is performed.

In Step 101, the difference between a first comparative value V1 and a second comparative value V2 is compared or checked.

The first comparative value V1 is indicated by the formula (5) and the second comparative value V2 is indicated by the formula (6).

$$V1 = |G(x-1,y) - G(x+1,y)|$$
$$+ ca \times (|R(x-2,y) - R(x,y)| + |R(x+2,y) - R(x,y)|)$$
$$+ cb \times (|G(x-1,y) - R(x,y)| + |G(x+1,y) - R(x,y)|) \tag{5}$$

$$V2 = |G(x,y-1) - G(x,y+1)|$$
$$+ ca \times (|R(x,y-2) - R(x,y)| + |R(x,y+2) - R(x,y)|)$$
$$+ cb \times (|G(x,y-1) - R(x,y)| + |G(x,y+1) - R(x,y)|) \tag{6}$$

wherein $G(x+1,y)$, $G(x-1,y)$, $G(x,y+1)$, and $G(x,y-1)$ are the first G-signals of pixels offset from the objective pixel, contained in the image belonging to the first pattern, in the right, left, lower, and upper directions by one pixel, $R(x+2,y)$, $R(x-2,y)$, $R(x,y+2)$, and $R(x,y-2)$ are the first R-signals of pixels offset from the objective pixel in the right, left, lower, and upper directions by two pixels, $R(x,y)$ is the first R-signal of the objective pixel, and ca and cb are coefficients.

Regarding each of the objective pixels contained in images belonging to the first pattern, a first interpolated G-signal is obtained based on a first difference signal, second difference signals, and third difference signals. The first difference signal is a difference between the first G-signals of pixels offset from the first objective pixel in the right and left directions or the upper and lower directions by one pixel. Each of the second difference signals is a difference between the first R-signal of the objective pixel and the first R-signal of a pixel (i.e., a pixel which belongs to the first pattern and is the closest to the objective pixel) offset from the objective pixel in the right, left, upper, or lower direction by two pixels. Each of the third difference signals is a difference between the first R-signal of the objective pixel and the first G-signal of a pixel offset from the objective pixel in the right, left, upper, or lower direction by one pixel.

The coefficients ca and cb indicate ratios of the second and third difference signals to the coefficients (=1) of the first difference signals. The values of ca and cb change in accordance with the degree of the correlation between the objective pixel and the offset pixels of images, and may be ca=½ and cb=½; These values can be obtained experimentally.

When the coordinates of the objective pixel are (2,2) (i.e., an image of the first pattern), for example, the objective pixel is R(2,2). The first comparative value V1 and the second comparative value V2 are as follows:

$$V1=|G(1,2)-G(3,2)|+ca\times(|R(0,2)-R(2,2)|+|R(4,2)-R(2,2)|)$$
$$+cb\times(|G(1,2)-R(2,2)|+|G(3,2)-R(2,2)|)$$

$$V2=|G(2,1)-G(2,3)|+ca\times(|R(2,0)-R(2,2)|+|R(2,4)-R(2,2)|)$$
$$+cb\times(|G(2,1)-R(2,2)|+|G(2,3)-R(2,2)|)$$

The first difference signal (G(1,2)–G(3,2), for example) and the second difference signal (R(0,2)–R(2,2), for example) are used for selecting the direction (right, left, upper, and lower) of the pixel having a G-signal and R-signal with the closest luminance levels to the objective pixel. The third difference signal (G(1,2)–G(2,2), for example) is used for selecting the direction of the pixel having the closest correlation color difference to the objective pixel.

When it is determined in Step 101 that the first comparative value V1 is less than the second comparative value V2, Step 102 is executed. Namely, an arithmetic mean of the first G-signals of the pixels offset in the right and left directions by one pixel is obtained as a first interpolated G-signal g. Conversely, when it is determined in Step 101 that the first comparative value V1 is not less than the second comparative value V2, Step 103 is executed so that an arithmetic mean of the first G-signals of the pixels offset in the upper and lower directions by one pixel is obtained as a first interpolated G-signal g. After the execution of Step 102 or 103, the first G-interpolation process ends.

Figure 5:
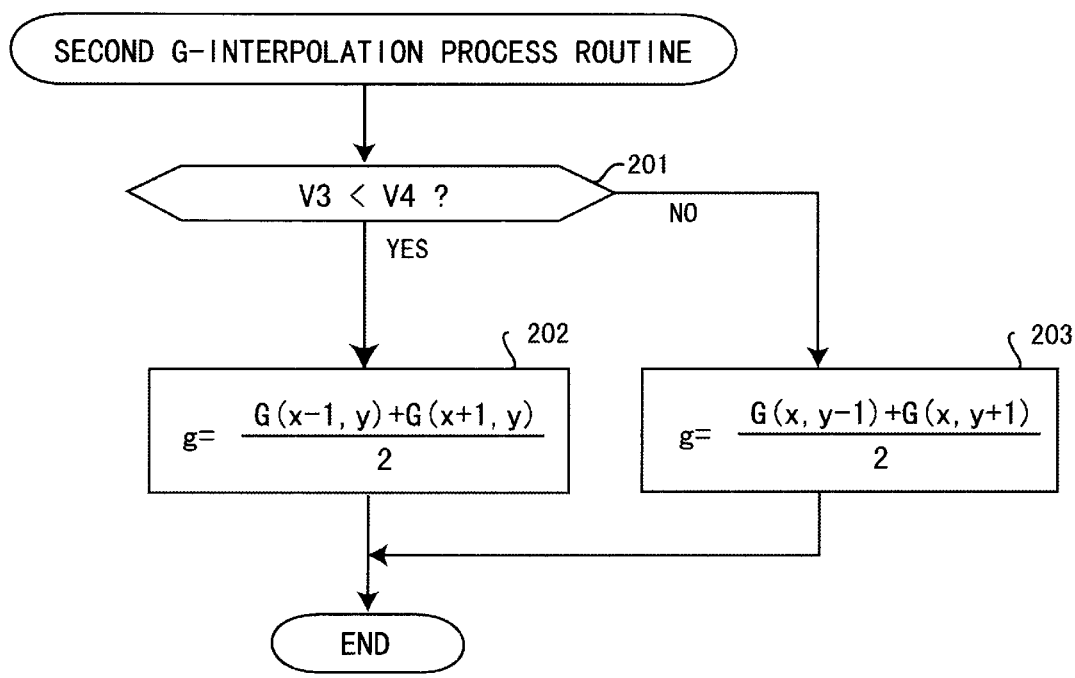
FIG. 5 is a flowchart of a second G-interpolation process routine.

FIG. 5 is a flowchart of the second G-interpolation process routine. In the second G-interpolation process routine, an interpolation process for images belonging to the fourth pattern is performed.

In Step 201, the difference between a third comparative value V3 and a fourth comparative value V4 is compared or checked.

The third comparative value V3 is indicated by the formula (7) and the fourth comparative value V4 is indicated by the formula (8).

$$V3=|G(x-1,y)-G(x+1,y)|$$
$$+ca\times(|B(x-2,y)-B(x,y)|+|B(x+2,y)-B(x,y)|)$$
$$+cb\times(|G(x-1,y)-B(x,y)|+|G(x+1,y)-B(x,y)|) \quad (7)$$

$$V4=|G(x,y-1)-G(x,y+1)|$$
$$+ca\times(|B(x,y-2)-B(x,y)|+|B(x,y+2)-B(x,y)|)$$
$$+cb\times(|G(x,y-1)-B(x,y)|+|G(x,y+1)-B(x,y)|) \quad (8)$$

wherein G(x+1,y), G(x–1,y), G(x,y+1), and G(x,y–1) are the first G-signals of pixels offset from the objective pixel, contained in the image belonging to the fourth pattern, in the right, left, lower, and upper directions by one pixel, B(x+2, y), B(x–2,y), B(x,y+2), and B(x,y–2) are the first B-signals of pixels offset from the objective pixel in the right, left, lower, and upper directions by two pixels, B(x,y) is the first B-signal of the objective pixel, and ca and cb are coefficients.

Regarding each of the objective pixels contained in images belonging to the fourth pattern, a second interpolated G-signal is obtained based on a fourth difference signal, fifth difference signals, and sixth difference signals. The fourth difference signal is a difference between the first G-signals offset from the first objective pixel in the right and left directions or the upper and lower directions by one pixel. Each of the fifth difference signals is a difference between the first B-signal of the objective pixel and the first B-signal of a pixel (i.e., a pixel which belongs to the fourth pattern and is the closest to the objective pixel) offset from the objective pixel in the right, left, upper, or lower direction by two pixels. Each of the sixth difference signals is a difference between the first B-signal of the objective pixel and the first G-signal of a pixel offset from the objective pixel in the right, left, upper, or lower direction by one pixel.

The coefficients ca and cb indicate ratios of the second and third difference signals to the coefficients (=1) of the first difference signal. As mentioned, the values of ca and cb change in accordance with the degree of the correlation between the objective pixel and the offset pixels of images, and may be ca=½ and cb=½; These values can be obtained experimentally.

When it is determined in Step 201 that the third comparative value V3 is less than the fourth comparative value V4, Step 202 is executed, in which an arithmetic mean of the first G-signals of the pixels offset in the right and left directions by one pixel is obtained as a second interpolated G-signal g. Conversely, when it is determined in Step 201 that the third comparative value V3 is not less than the fourth comparative value V4, Step 203 is executed in which an arithmetic mean of the first G-signals of the pixels offset in the upper and lower directions by one pixel is obtained as a second interpolated G-signal g. After the execution of Step 202 or 203, the second G-interpolation process ends.

When the first and second G-interpolation process routines have been executed, the G-signals of all of the pixels forming the whole image have been obtained.

Figure 6:
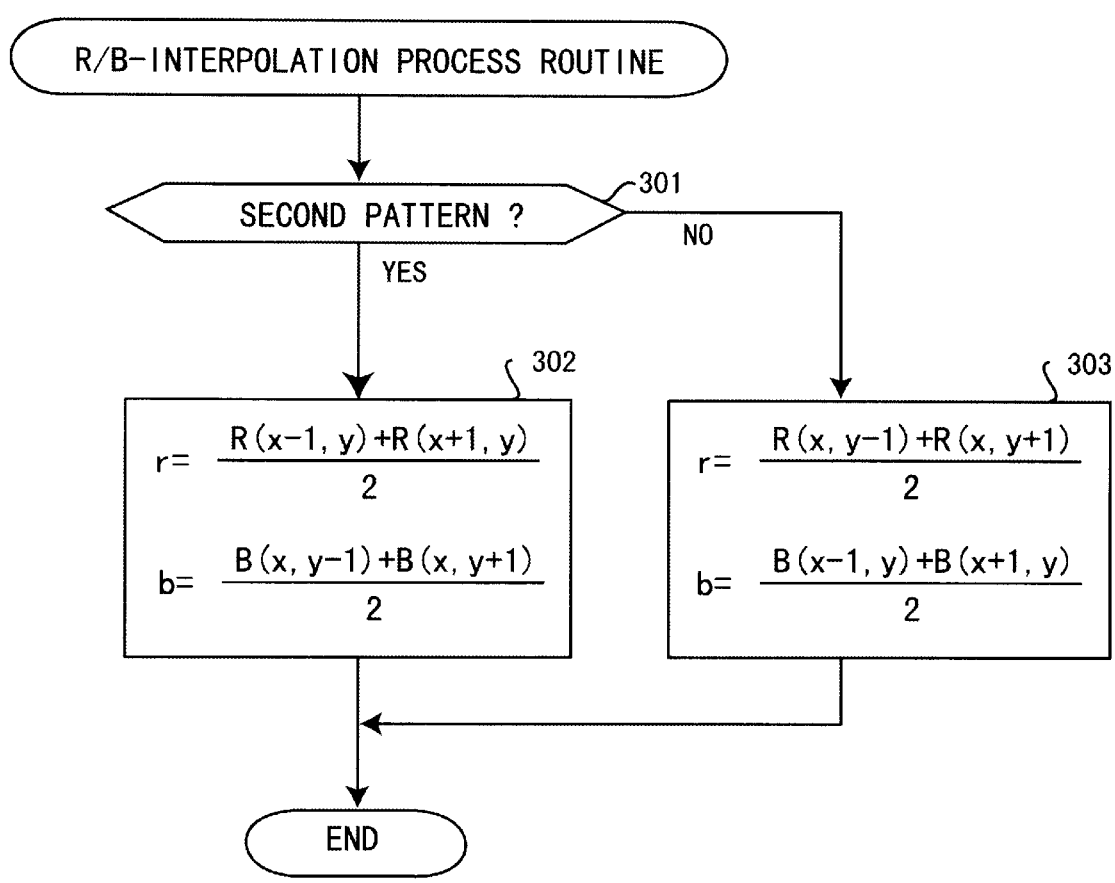
FIG. 6 is a flowchart of an R/B-interpolation process routine.

FIG. 6 is a flowchart of the R/B-interpolation process routine. In the R/B-interpolation process routine, an interpolation process for images belonging to the second and third patterns is performed. Pixels utilized in the R/B-interpolation process routine are contained in the images belonging to the first and fourth patterns.

In Step 301, it is determined whether the objective pixel is contained in an image belonging to the second pattern. When the objective pixel is contained in the second pattern, i.e., when the objective pixel is a first G-signal, which is positioned at the upper-right corner of the pixel matrix M1 (FIG. 2), Step 302 is executed. Conversely, when the objective pixel is not contained in the second pattern, i.e., when the objective pixel is contained in the third pattern, and is a first G-signal which is positioned at the lower-left corner of the pixel matrix M1 (FIG. 2), Step 303 is executed.

In Step 302, an arithmetic mean of R(x−1,y) and R(x+1,y), which are pixel signals adjacent to the left and right sides of the objective pixel (i.e., an image of the first pattern), is obtained as a second R-signal r of the objective pixel. Further, an arithmetic mean of B(x,y−1) and B(x,y+1), which are pixel signals adjacent to the upper and lower sides of the objective pixel (i.e., an image of the fourth pattern), is obtained as a second B-signal b of the objective pixel.

In Step 303, an arithmetic mean of R(x,y−1) and R(x,y+1), which are pixel signals adjacent to the upper and lower sides of the objective pixel (i.e., an image of the first pattern), is obtained as a second R-signal r of the objective pixel. Further, an arithmetic mean of B(x−1,y) and B(x+1,y), which are pixel signals adjacent to the left and right sides of the objective pixel (i.e., an image of the fourth pattern), is obtained as a second B-signal b of the objective pixel.

After the execution of Step 302 or 303, the R/B-interpolation process ends. Thus, in the R/B-interpolation process routine, regarding each of the pixels in the images belonging to the second and third patterns, the pixel signals adjacent to the right, left, upper, and lower sides are interpolated, so that the second R, and B-signals are obtained. When the first and second G-interpolation process routines (FIGS. 4 and 5) have been executed and the R/B-interpolation process routine has been executed for all of the pixels of the images belonging to the second and third patterns, the G-signals are obtained for all of the pixels forming the whole image, and the second R-signals r and the second B-signals b are obtained for each of the pixels of the images belonging to the second and third patterns, as understood from FIG. 7. Namely, regarding the image belonging to the first pattern, B-signals have not been obtained yet, and regarding the image belonging to the fourth pattern, R-signals have not been obtained yet.

Figure 8A:
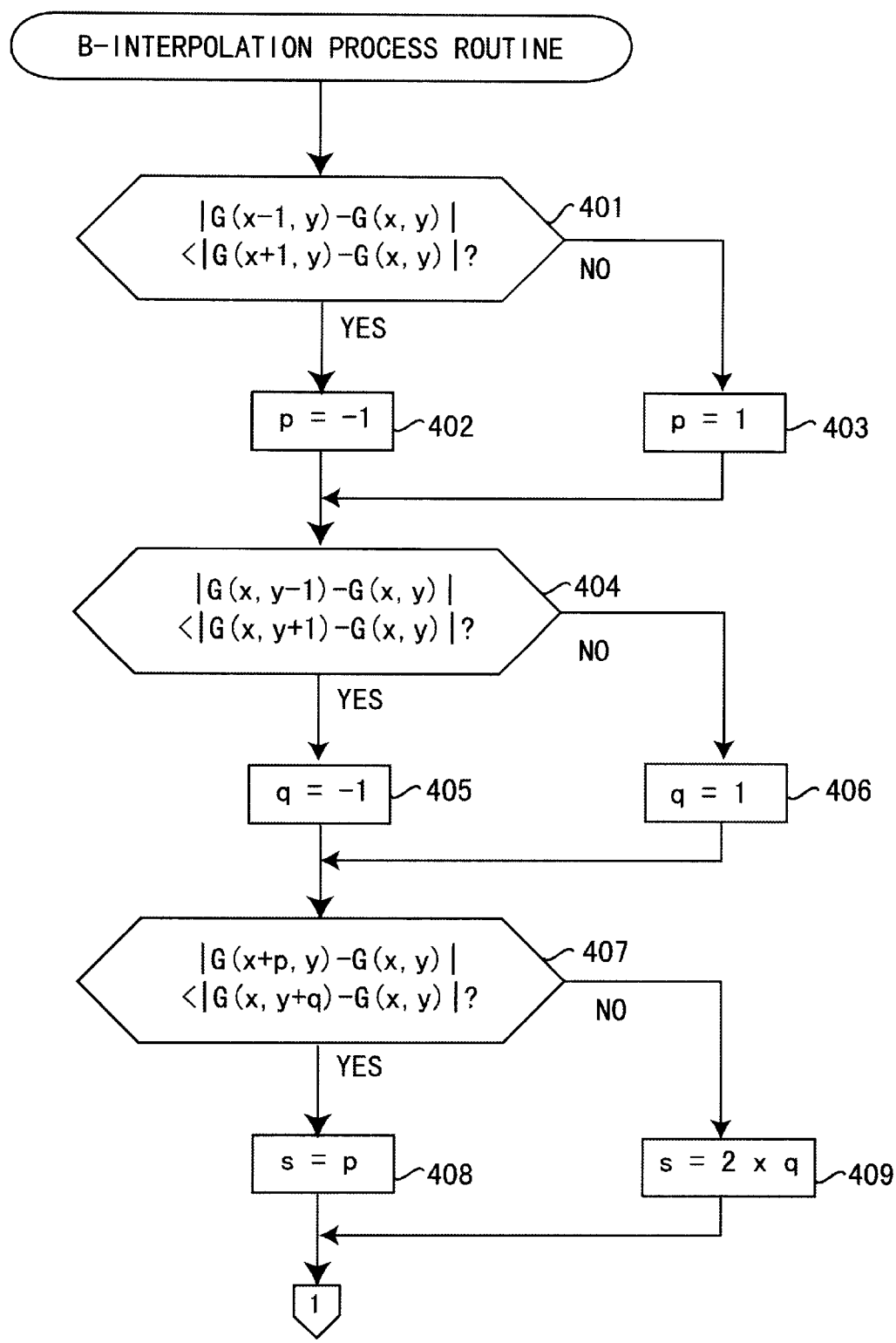
FIGS. 8A and 8B show a flowchart of a B-interpolation process routine.
Figure 8B:
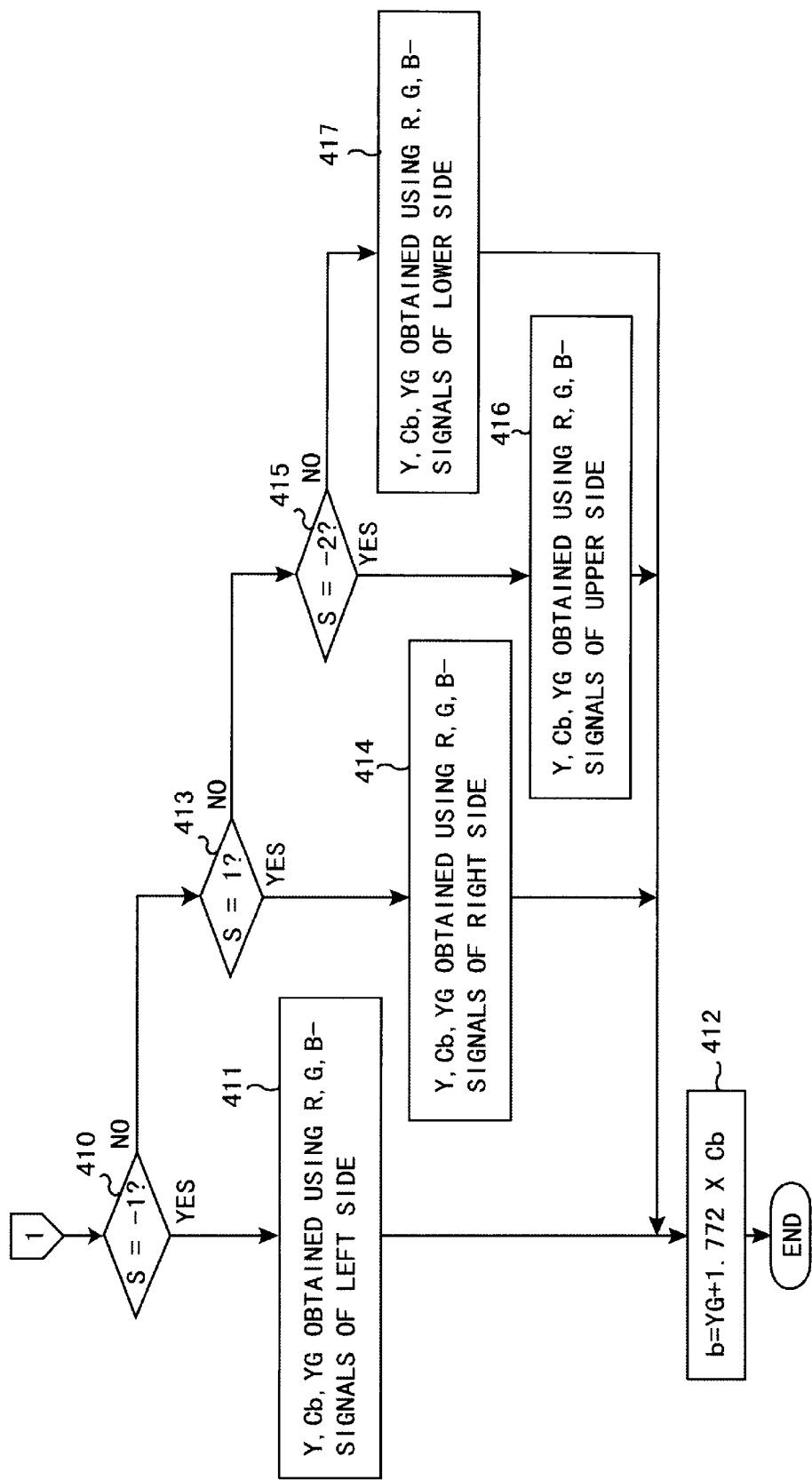

FIGS. 8A and 8B show a flowchart of the B-interpolation process routine, by which third B-signals are obtained for the pixels of the image belonging to the first pattern. Pixels utilized in the B-interpolation process routine are contained in the images belonging to the second and third patterns.

In Step 401, it is determined whether the absolute value of the difference between G(x−1,y) and G(x,y) is less than the absolute value of the difference between G(x+1,y) and G(x,y) G(x−1,y) is a first G-signal of a pixel adjacent to the left side of the objective pixel. G(x+1,y) is a first G-signal of a pixel adjacent to the right side of the objective pixel. G(x,y) is a first interpolated G-signal of the objective pixel. Thus, it is determined which first G-signal of a pixel, adjacent to the right or left side of the objective pixel, has the closer value to that of the first interpolated G-signal of the objective pixel. When the first G-signal of a pixel adjacent to the left side is closer to the first interpolated G-signal of the objective pixel, Step 402 is executed in which a parameter p is set to −1. Conversely, when the first G-signal of a pixel adjacent to the right side is closer to the first interpolated G-signal of the objective pixel, or when the left side of the inequality of Step 401 is equal to the right side of that, Step 403 is executed in which the parameter p is set to 1.

In Step 404, it is determined whether the absolute value of the difference between G(x,y−1) and G(x,y) is less than the absolute value of the difference between G(x,y+1) and G(x,y). G(x,y−1) is a first G-signal of a pixel adjacent to the upper side of the objective pixel. G(x,y+1) is a first G-signal of a pixel adjacent to the lower side of the objective pixel. Thus, it is determined which first G-signal of a pixel, adjacent to the upper or lower side of the objective pixel, has the closer value to that of the first interpolated G-signal of the objective pixel. When the first G-signal of a pixel adjacent to the upper side is closer to the first interpolated G-signal of the objective pixel, Step 405 is executed in which a parameter q is set to −1. Conversely, when the first G-signal of a pixel adjacent to the lower side is closer the first interpolated G-signal of the objective pixel, or when the left side of the inequality of Step 404 is equal to the right side of that, Step 406 is executed in which the parameter q is set to 1.

In Step 407, the values of the G-signals are compared regarding a pixel adjacent to the right or left side of the objective pixel, a pixel adjacent to the upper or lower side of the objective pixel, and the objective pixel. When the first G-signal of the pixel on the left side is closer to the first interpolated G-signal of the objective pixel in comparison with the first G-signal on the right side, and the first G-signal of the pixel on the upper side is closer to the first interpolated G-signal of the objective pixel in comparison with the first G-signal of the pixel on the lower side, the parameters p and q are −1, and it is determined whether an absolute value of the difference between G(x−1,y) and G(x,y) is less than an absolute value of the difference between G(x,y−1) and G(x,y). When the first G-signal of the left side is closer to the first interpolated G-signal of the objective signal, Step 408 is executed in which a parameter s is set to p, i.e., −1. Conversely, when the first G-signal of the upper side is closer to the first interpolated G-signal of the objective signal, or when the left side of the inequality of Step 407 is equal to the right side of that, Step 409 is executed in which the parameter s is set to 2×q, i.e., −2.

When both of the parameters p and q are 1, when the parameters p and q are −1 and 1, or when the parameters p and q are 1 and −1, Step 407 and Step 408 or 409 are executed in a similar way as the above. Thus, in the B-interpolation process routine, regarding the first interpolated G-signal of the objective pixel, the values of the first G-signals of the pixels, which are contained in the second and third patterns and positioned adjacent to the objective pixel, are checked. As a result, if the first G-signal of the pixel adjacent to the left side is the closest to the first interpolated G-signal of the objective pixel, the parameter s is set to −1. If the first G-signal of the pixel adjacent to the right side is the closest, the parameter s is set to 1, if the first G-signal of the pixel adjacent to the upper side is the closest, the parameter s is set to −2, and if the first G-signal of the pixel adjacent to the lower side is the closest, the parameter s is set to 2.

In this specification, among the adjacent four pixels, the pixel having the first G-signal, which is determined in the B-interpolation process routine to have the closest value to the first interpolated G-signal of the objective pixel, is referred to as a first similar pixel. Preferably, the pixel having the closest luminance value to that of the objective pixel is selected as the first similar pixel. However, the luminance value of the objective pixel is unknown. Therefore, the luminance value is presumed using the G-signal, so that the first similar pixel is extracted, as described above.

In Step 410, it is determined whether the parameter s is −1, i.e., whether the first similar pixel is adjacent to the left side of the objective pixel. When the parameter s is −1, Step 411 is executed in which a luminance value Y, a color difference signal Cb, and a modified luminance value YG are obtained using R(x−1,y), G(x−1,y), and B(x−1,y) which are the second R, first G, and second B-signals of the first similar pixel.

The luminance value Y, the color difference signal Cb, and the modified luminance value YG are calculated according to the following formulas (9), (10), and (11).

$$Y=0.299 \times R(x-1,y)+0.587 \times G(x-1,y)+0.114 \times B\ (x-1,y) \quad (9)$$

$$Cb=-0.169 \times R(x-1,y)-0.331 \times G(x-1,y)+0.5 \times B\ (x-1,y) \quad (10)$$

$$YG=Y \times G(x,y)/G(x-1,y) \quad (11)$$

The formulas (9) and (10) are known. The modified luminance value YG is obtained by multiplying the luminance value Y by a ratio of the first interpolated G-signal of the objective pixel and the first G-signal of the first similar pixel, as understood from the formula (11).

In Step 412, a third B-signal b of the objective pixel is calculated according to the formula (12), and thus the B-interpolation process routine ends.

$$b=YG+1.772 \times Cb \quad (12)$$

Note that the formula (12) is obtained by defining the color difference signal Cb as $Cb=(B-Y) \times 0.5/(1-0.114)$, and by transforming this definition formula while substituting the modified luminance value YG for the luminance value Y.

Thus, in the first embodiment, the third B-signal of the objective pixel is obtained, supposing that the color difference signal Cb of the objective pixel is equal to the color difference signal Cb of the first similar pixel, and deeming the modified luminance value YG to be the luminance value of the objective pixel.

When it is determined in Step 410 that the parameter s is not −1, the process goes to Step 413 in which it is determined whether the parameters is 1, i.e., whether the first similar pixel is adjacent to the right side of the objective pixel. When the parameter s is 1, Step 414 is executed in which a luminance value Y, a color difference signal Cb, and a modified luminance value YG are obtained using the second R, first G, and second B-signals of the first similar pixel.

The luminance value Y, the color difference signal Cb, and the modified luminance value YG are calculated according to the following formulas (9a), (10a), and (11a).

$$Y=0.299 \times R(x+1,y)+0.587 \times G(x+1,y)+0.114 \times B\ (x+1,y) \quad (9a)$$

$$Cb=-0.169 \times R(x+1,y)-0.331 \times G(x+1,y)+0.5 \times B\ (x+1,y) \quad (10a)$$

$$YG=Y \times G(x,y)/G(x+1,y) \quad (11a)$$

Step 412 is then executed, so that the third B-signal of the objective pixel is calculated according to formula (12), and the B-interpolation process routine ends.

When it is determined in Step 413 that the parameter s is not 1, the process goes to Step 415 in which it is determined whether the parameter s is −2, i.e., whether the first similar pixel is adjacent to the upper side of the objective pixel. When the parameter s is −2, Step 416 is executed in which a luminance value Y, a color difference signal Cb, and a modified luminance value YG are obtained using the second R, first G, and second B-signals of the first similar pixel.

The luminance value Y, the color difference signal Cb, and the modified luminance value YG are calculated according to the following formulas (9b), (10b), and (11b).

$$Y=0.299 \times R(x,y-1)+0.587 \times G(x,y-1)+0.114 \times B\ (x,y-1) \quad (9b)$$

$$Cb=-0.169 \times R(x,y-1)-0.331 \times G(x,y-1)+0.5 \times B\ (x,y-1) \quad (10b)$$

$$YG=Y \times G(x,y)/G(x,y-1) \quad (11b)$$

Then, in ways similar to those in Steps 411 and 414, Step 412 is executed in which the third B-signal of the objective pixel is calculated according to formula (12), and the B-interpolation process routine ends.

When it is determined in Step 415 that the parameter s is not −2, it is deemed that the parameter is 2, i.e., it is deemed that the first similar pixel is adjacent to the lower side of the objective pixel. Thus, Step 417 is executed in which a luminance value Y, a color difference signal Cb, and a modified luminance value YG are obtained using the second R, first G, and second B-signals of the first similar pixel.

The luminance value Y, the color difference signal Cb, and the modified luminance value YG are calculated according to the following formulas (9c), (10c), and (11c).

$$Y=0.299 \times R(x,y+1)+0.587 \times G(x,y+1)+0.114 \times B\ (x,y+1) \quad (9c)$$

$$Cb=-0.169 \times R(x,y+1)-0.331 \times G(x,y+1)+0.5 \times B\ (x,y+1) \quad (10c)$$

$$YG=Y \times G(x,y)/G(x,y+1) \quad (11c)$$

Then, in ways similar to those in Steps 411, 414, and 416, Step 412 is executed in which the third B-signal of the objective pixel is calculated according to formula (12), and the B-interpolation process routine ends.

The B-interpolation process routine is executed for all of the pixels of the image belonging to the first pattern. When the first and second G-interpolation process routines (FIGS. 4 and 5), the R/B-interpolation process routine (FIG. 6), and the B-interpolation process routine (FIGS. 8A and 8B) have been completed, the R, G, and B-signals are obtained for the images belonging to the first, second, and third patterns; however, the R-signals of the image belonging to the fourth pattern have not been obtained yet.

Figure 9:
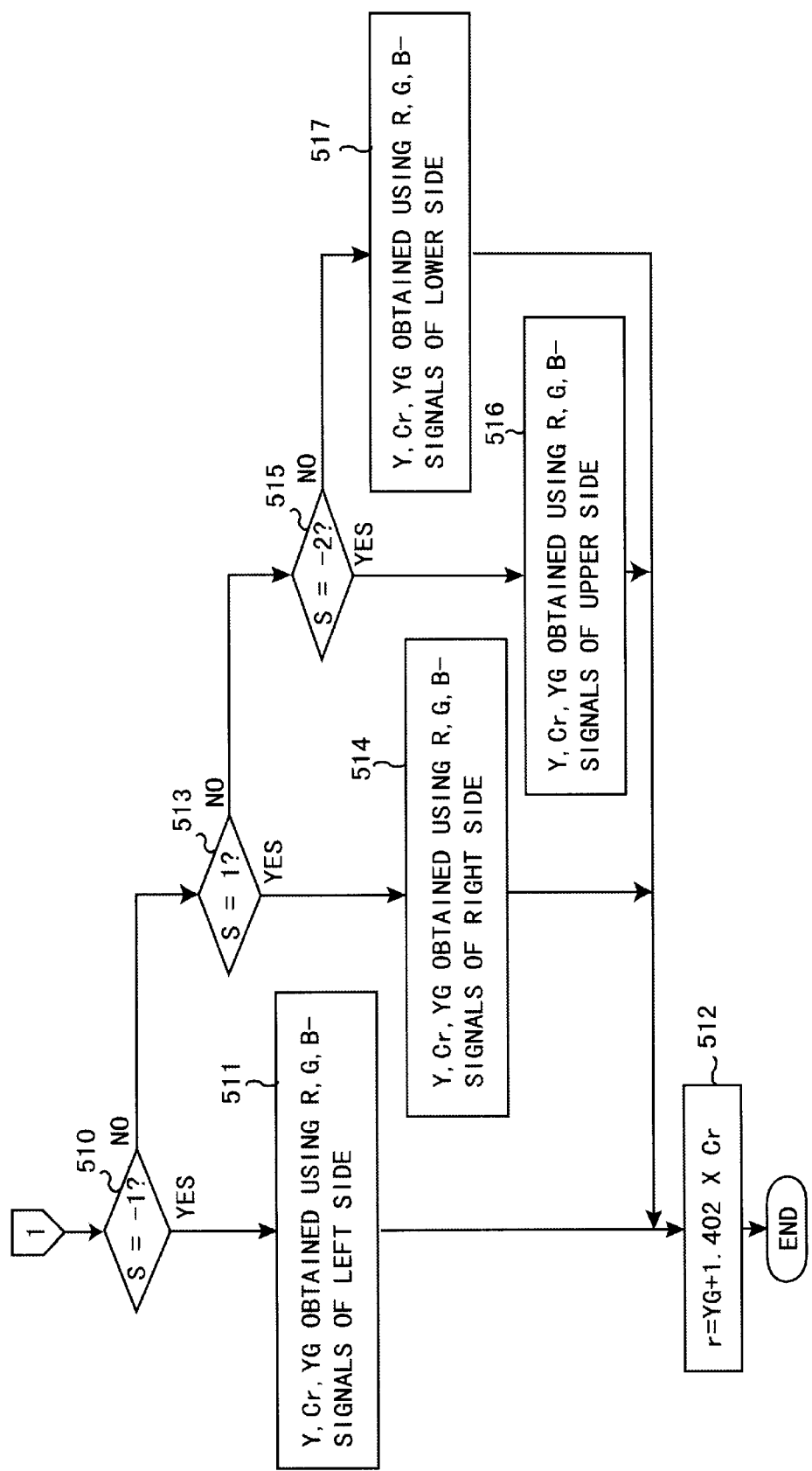
FIG. 9 is the latter part of a flowchart of the R-interpolation process routine.

The R-signals of the image of the fourth pattern are obtained by the R-interpolation process routine. FIG. 9 is the latter part of a flowchart of the R-interpolation process routine. Note that, since the initial part of the flowchart is identical to that of the B-interpolation process routine shown in FIG. 8A, excepting that the pixel having the first G-signal, which is determined in the R-interpolation process routine to have the closest luminance to the second G-signal of the objective pixel, is referred to as a second similar pixel, the initial part is omitted. Pixels utilized in the R-interpolation process routine are contained in the images belonging to the second and third patterns, respectively.

The contents of Steps 510, 513, and 515 are the same as those of Steps 410, 413, and 415 (FIG. 8B). Although the contents of Steps 511, 512, 514, 516, and 517 are basically the same as those of Steps 411, 412, 414, 416, and 417, a color difference signal Cr is utilized to obtain the R-signal in the R-interpolation process routine, which is different from the B-interpolation process routine.

In Step 511, a luminance value Y, a color difference signal Cr, and a modified luminance value YG are calculated according to the following formulas (12), (13), and (14).

$$Y=0.299 \times R(x-1,y)+0.587 \times G(x-1,y)+0.114 \times B\ (x-1,y) \quad (12)$$

$$Cr=0.5 \times R(x-1,y)-0.419 \times G(x-1,y)-0.081 \times B\ (x-1,y) \quad (13)$$

$$YG=Y \times G(x,y)/G(x-1,y) \quad (14)$$

In Step 512, a third R-signal r of the objective pixel is calculated according to the formula (15), using the modified luminance value YG, and the color difference signal Cr.

$$r=YG+1.402\times Cr \qquad (15)$$

Note that the formula (15) is obtained by defining the color difference signal Cr as $Cr=(R-Y)\times 0.5/(1-0.299)$, and by transforming this definition formula while substituting the modified luminance value YG for the luminance value Y.

In Step 514, the luminance value Y, the color difference signal Cr, and the modified luminance value YG are calculated according to the following formulas (12a), (13a), and (14a).

$$Y=0.299\times R(x+1,y)+0.587\times G(x+1,y)+0.114\times B\ (x+1,y) \qquad (12a)$$

$$Cr=0.5\times R(x+1,y)-0.419\times G(x+1,y)-0.081\times B\ (x+1,y) \qquad (13a)$$

$$YG\text{-}=Y\times G(x,y)/G(x+1,y) \qquad (14a)$$

In Step 516, the luminance value Y, the color difference signal Cr, and the modified luminance value YG are calculated according to the following formulas (12b), (13b), and (14b).

$$Y=0.299\times R(x,y-1)+0.587\times G(x,y-1)+0.114\times B\ (x,y-1) \qquad (12b)$$

$$Cr=0.5\times R(x,y-1)-0.419\times G(x,y-1)-0.081\times B\ (x,y-1) \qquad (13b)$$

$$YG=Y\times G(x,y)/G(x,y-1) \qquad (14b)$$

In Step 517, the luminance value Y, the color difference signal Cr, and the modified luminance value YG are calculated according to the following formulas (12c), (13c), and (14c).

$$Y=0.299\times R(x,y+1)+0.587\times G(x,y+1)+0.114\times B\ (x,y+1) \qquad (12c)$$

$$Cr=0.5\times R(x,y+1)-0.419\times G(x,y+1)-0.081\times B\ (x,y+1) \qquad (13c)$$

$$YG=Y\times G(x,y)/G(x,y+1) \qquad (14c)$$

The R-interpolation process routine is executed for all of the pixels of the image belonging to the fourth pattern.

Thus, in the R-interpolation process routine, in a similar way as in the B-interpolation process routine, the third R-signal of the objective pixel is obtained by supposing that the color difference signal Cr of the objective pixel is equal to the color difference signal Cr of a second similar pixel, and by deeming the modified luminance value YG to be the luminance value of the objective pixel.

As described above, in the first and second G-interpolation process routines (FIGS. 4 and 5), regarding an objective pixel and pixels positioned close to the objective pixel, an interpolation process of the objective pixel is performed using not only the correlation of G-signal and R-signal or B-signal, but also the correlation of the color difference signals. Therefore, even if an error occurs in the interpolation process, the difference between the color difference signals in the objective pixel and the pixels around the objective pixel becomes small, so that a chromatic blur occurring in a reproduced image can be reduced.

Note that, although the color difference signals of the similar pixel are used as the color difference signals of the objective pixel to obtain a B-signal or an R-signal of the objective pixel in both the B-interpolation process routine (FIGS. 8A and 8B) and the R-interpolation process routine (FIG. 9) in the embodiment, an arithmetic mean of B-signals or R-signals of pixels positioned around the objective pixel can be used.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-018258 (filed on Jan. 26, 2001) which is expressly incorporated herein, by reference, in its entirety.

What is claimed is:

1. An image interpolating device comprising:

a color filter having a first row, in which red (R) and green (G) color filter elements are alternately aligned in the horizontal direction, and a second row, in which G and blue (B) color filter elements are alternately aligned in the horizontal direction, said second row being adjacent to one of an upper side and a lower side of said first row;

an imager that generates first R, G, and B-signals which are pixel signals corresponding to said color filter elements;

a pattern-setter that extracts images belonging to a first pattern, in which a pixel having said first R-signal is positioned at the upper-left corner of a 2×2 pixel matrix, a second pattern, in which a pixel having said first G-signal is positioned at the upper-right corner of said 2×2 pixel matrix, a third pattern, in which a pixel having said first G-signal is positioned at the lower-left corner of said 2×2 pixel matrix, and a fourth pattern, in which a pixel having said first B-signal is positioned at the lower-right corner of said 2×2 pixel matrix, from said first R, G, and B-signals generated by said imager;

a first G-interpolator that, regarding a first objective pixel contained in said images belonging to said first pattern, obtains a first interpolated G-signal based on a first difference signal, which is a difference between said first G-signals of pixels offset from said first objective pixel in the right and left directions or the upper and lower directions by one pixel, second difference signals, each of which is a difference between said first R-signal of said first objective pixel and said first R-signal of a pixel offset from said first objective pixel in the right, left, upper, or lower direction by two pixels, third difference signals, each of which is a difference between said first R-signal of said first objective pixel and said first G-signal of a pixel offset from said first objective pixel in the right, left, upper, or lower direction by one pixel;

a second G-interpolator that, regarding a fourth objective pixel contained in said images belonging to said fourth pattern, obtains a second interpolated G-signal based on a fourth difference signal, which is a difference between said first G-signals of pixels offset from said fourth objective pixel in the right and left directions or the upper and lower directions by one pixel, fifth difference signals, each of which is a difference between said first B-signal of said fourth objective pixel and said first B-signal of a pixel offset from said fourth objective pixel in the right, left, upper, or lower direction by two pixels, sixth difference signals, each of which is a difference between said first B-signal of said fourth objective pixel and said first G-signal of a pixel offset from said fourth objective pixel in the right, left, upper, or lower direction by one pixel;

an R/B-interpolator that, regarding second and third objective pixels contained in said images belonging to said second and third patterns, obtains second R and B-signals by utilizing said first R and B-signals of pixels adjacent to said second and third objective pixels;

a B-interpolator that extracts a first similar pixel which has the closest luminance value to that of said first objective pixel, from pixels adjacent to said first objective pixel, and obtains a third B-signal based on a pixel signal of said first similar pixel; and an R-interpolator that extracts a second similar pixel which has the closest luminance value to that of said fourth objective pixel, from pixels adjacent to said fourth objective pixel, and obtains a third R-signal based on a pixel signal of said second similar pixel.

2. A device according to claim 1, wherein said first G-interpolator obtains said first interpolated G-signal, based on the absolute value of said first difference signal, a sum of the absolute values of said second difference signals, and a sum of the absolute values of said third difference signals.

3. A device according to claim 1, wherein said first G-interpolator compares a first comparative value V1 indicated by the following first formula with a second comparative value V2 indicated by the following second formula, said first G-interpolator obtaining an average of said first G-signals from pixels offset from said first objective pixel in the right and left directions by one pixel as said first interpolated G-signal when said first comparative value V1 is less than said second comparative value V2, and obtaining an average of said first G-signals from pixels offset from said first objective pixel in the upper and lower directions by one pixel as said first interpolated G-signal when said first comparative value V1 is not less than said second comparative value V2:

$$V1=|G(x-1,y)-G(x+1,y)|$$

$$+ca \times (|R(x-2,y)-R(x,y)|+|R(x+2,y)-R(x,y)|)$$

$$+cb \times (|G(x-1,y)-R(x,y)|+|G(x+1,y)-R(x,y)|)$$

$$V2=|G(x,y-1)-G(x,y+1)|$$

$$+ca \times (|R(x,y-2)-R(x,y)|+|R(x,y+2)-R(x,y)|)$$

$$+cb \times (|G(x,y-1)-R(x,y)|+|G(x,y+1)-R(x,y)|)$$

wherein $G(x+1,y)$, $G(x-1,y)$, $G(x,y+1)$, and $G(x,y-1)$ are said first G-signals of pixels offset from said first objective pixel in the right, left, lower, and upper directions by one pixel, $R(x+2,y)$, $R(x-2,y)$, $R(x,y+2)$, and $R(x,y-2)$ are said first R-signals of pixels offset from said first objective pixel in the right, left, lower, and upper directions by two pixels, $R(x,y)$ is said first R-signal of said first objective pixel, and ca and cb are coefficients.

4. A device according to claim 1, wherein said second G-interpolator obtains said second interpolated G-signal, based on the absolute value of said fourth difference signal, a sum of the absolute values of said fifth difference signals, and a sum of the absolute values of said sixth difference signals.

5. A device according to claim 1, wherein said second G-interpolator compares a third comparative value V3 indicated by the following third formula with a fourth comparative value V4 indicated by the following fourth formula, said second G-interpolator obtaining an average of said first G-signals from pixels offset from said fourth objective pixel in the right and left directions by one pixel as said second interpolated G-signal when said third comparative value V3 is less than said fourth comparative value V4, and obtaining an average of said first G-signals from pixels offset from said fourth objective pixel in the upper and lower directions by one pixel as said second interpolated G-signal when said third comparative value V3 is not less than said fourth comparative value V4:

$$V3=|G(x-1,y)-G(x+1,y)|$$

$$+ca \times (|B(x-2,y)-B(x,y)|+|B(x+2,y)-B(x,y)|)$$

$$+cb \times (|G(x-1,y)-B(x,y)|+|G(x+1,y)-B(x,y)|)$$

$$V4=|G(x,y-1)-G(x,y+1)|$$

$$+ca \times (|B(x,y-2)-B(x,y)|+|B(x,y+2)-B(x,y)|)$$

$$+cb \times (|G(x,y-1)-B(x,y)|+|G(x,y+1)-B(x,y)|)$$

wherein $G(x+1,y)$, $G(x-1,y)$, $G(x,y+1)$, and $G(x,y-1)$ are said first G-signals of pixels offset from said fourth objective pixel in the right, left, lower, and upper directions by one pixel, $B(x+2,y)$, $B(x-2,y)$, $B(x,y+2)$, and $B(x,y-2)$ are said first B-signals of pixels offset from said fourth objective pixel in the right, left, lower, and upper directions by two pixels, $B(x,y)$ is said first B-signal of said fourth objective pixel, and ca and cb are coefficients.

6. A device according to claim 1, wherein said pixels, which are adjacent to said second and third objective pixels and which are utilized in said RIB-interpolator, are contained in said images belonging to said first and fourth patterns.

7. A device according to claim 1, wherein said pixels, which are adjacent to said first and fourth objective pixels and which are utilized in both said B-interpolator and said R-interpolator, are contained in said images belonging to said second and third patterns.

8. A device according to claim 1, wherein said B-interpolator and said R-interpolator respectively extract said first and second similar pixels, using said first G-signals of said pixels adjacent to said first and fourth objective pixels.

9. A device according to claim 1, wherein said processor B-interpolator obtains said third B-signal, on the assumption that a color difference signal Cb of said first objective pixel is equal to a color difference signal Cb of said first similar pixel.

10. A device according to claim 1, wherein said R-interpolator obtains said third R-signal, on the assumption that a color difference signal Cr of said fourth objective pixel is equal to a color difference signal Cr of said second similar pixel.

11. A device according to claim 1, wherein said B-interpolator obtains said third B-signal, using a said color difference signal Cb and a modified luminance value which is obtained by multiplying said luminance value by a ratio of said first interpolated G-signal of said first objective pixel and said first G-signal of said first similar pixel.

12. A device according to claim 11, wherein said B-interpolator obtains said third B-signal, according to the following formula: formula:

$$Y=0.299 \times R(x',y')+0.587 \times G(x',y')+0.114 \times B(x',y')$$

$$Cb=-0.169 \times R(x',y')-0.331 \times G(x',y')+0.5 \times B(x',y')$$

$$YG=Y \times G(x,y)/G(x',y')$$

$$b=YG+1.772 \times Cb$$

wherein Y is a luminance value of said first similar pixel, R(x',y'), G(x',Y'), and B(x',y') are said second R, first G, and second B-signals of said first similar pixel, G(x,y) is said first interpolated G-signal of said first objective pixel, b is said third B-signal obtained by said B-interpolator, and YG is said modified luminance value.

13. A device according to claim 1, wherein said R-interpolator obtains said third R-signal, using a color difference signal Cr and a modified luminance value which is obtained by multiplying said luminance value by a ratio of said second interpolated G-signal of said fourth objective pixel and said first G-signal of said second similar pixel.

14. A device according to claim 13, wherein said R-interpolator obtains said third R-signal, according to the following formula:

$$Y=0.299 \times R(x',y')+0.587 \times G(x',y')+0.114 \times B(x',y')$$

$$Cr=0.5 \times R(x',y')-0.419 \times G(x',y')-0.081 \times B(x',y')$$

$$YG=Y \times G(x,y)/G(x',y')$$

$$r=YG+1.402 \times Cr$$

wherein Y is a luminance value of said second similar pixel, R(x',Y'), G(x',y'), and B(x',y') are said second R, first G, and second B-signals of said second similar pixel, G(x,y) is said second interpolated G-signal of said fourth objective pixel, r is said third R-signal obtained by said R-interpolator, and YG is said modified luminance value.

* * * * *